United States Patent
Brahem et al.

(10) Patent No.: US 11,149,208 B2
(45) Date of Patent: Oct. 19, 2021

(54) PACKING FOR IMPROVING CONTACT BETWEEN A GAS PHASE AND A DISPERSED SOLID PHASE MOVING IN COUNTER-CURRENT FLOW

(71) Applicant: IFP Energies Nouvelles, Rueil-Malmaison (FR)

(72) Inventors: Rim Brahem, Lyons (FR); Benjamin Amblard, Lyons (FR); Ann Cloupet, Longes (FR); Thierry Gauthier, Brignais (FR); Ludovic Raynal, Oullins (FR)

(73) Assignee: IFP Energies Nouvelles, Rueil-Malmaison (FR)

( * ) Notice: Subject to any disclaimer, the term of this patent is extended or adjusted under 35 U.S.C. 154(b) by 0 days.

(21) Appl. No.: 16/469,318

(22) PCT Filed: Dec. 5, 2017

(86) PCT No.: PCT/EP2017/081428
§ 371 (c)(1),
(2) Date: Jun. 13, 2019

(87) PCT Pub. No.: WO2018/108614
PCT Pub. Date: Jun. 21, 2018

(65) Prior Publication Data
US 2020/0109334 A1    Apr. 9, 2020

(30) Foreign Application Priority Data

Dec. 14, 2016 (FR) .................................. 1662459

(51) Int. Cl.
*B01J 19/32* (2006.01)
*C10G 11/18* (2006.01)

(52) U.S. Cl.
CPC ............... *C10G 11/18* (2013.01); *B01J 19/32* (2013.01); *B01J 2219/32241* (2013.01); *B01J 2219/3306* (2013.01); *B01J 2219/3325* (2013.01)

(58) Field of Classification Search
CPC .............. B01J 19/32; B01J 2219/32241; B01J 2219/3222; B01J 2219/322; B01J 2219/32;
(Continued)

(56) References Cited

U.S. PATENT DOCUMENTS

2003/0047820 A1   3/2003  Lehman et al.
2005/0249648 A1*  11/2005  Kehrer ................... B01J 19/32
                                                                422/211

FOREIGN PATENT DOCUMENTS

FR          2806325 B1    10/2002

OTHER PUBLICATIONS

International Search Report PCT/EP2017/081428 dated Feb. 1, 2018 (pp. 1-3).
(Continued)

*Primary Examiner* — Lessanework Seifu
(74) *Attorney, Agent, or Firm* — Millen White Zelano & Branigan

(57) ABSTRACT

The present invention describes a packing with a three-dimensional structure which is particularly suited to creating homogenous and anisotropic mixing between a gas phase and a dispersed solid phase moving in counter-current flow. Application of this packing to the stripper of fluidized catalytic cracking units.

11 Claims, 3 Drawing Sheets a.

b.

(58) Field of Classification Search
CPC .... B01J 2219/32262; B01J 2219/32234; B01J
2219/32231; B01J 2219/32227; B01J
2219/3325; B01J 2219/3306
See application file for complete search history.

(56) References Cited

OTHER PUBLICATIONS

N.N.: "Mixing and Reaction Technology Pace Setting Technology", May 10, 2016 (May 10, 2016), XP055399522, Retrieved from the Internet <URL:http://www.sulzer.com/en/-/media/Documents/ProductsAndServices/Mixpac_Cartridges_Applications_Static_Mixers/Static_Mixers/Brochures/Mixing_and_Reaction_Technology_e_23270640.pdf> [retrieved on Aug. 17, 2017].
Raschig Jaeger: "Metal Structured Packing—MaxPak Product Bulletin 525 Table of Contents", Jul. 6, 2010 (Jul. 6, 2010), XP055399523, Retrieved from the Internet <URL:http://www.raschig.de/editor/assets/RaschigRings/Literature - Structured packings/Info RASCHIG-JAEGER MaxPak Structured Packing-525.pdf> [retrieved on Aug. 17, 2017].
Inc. Chemineer: "Kenics—Static Mixing technology", Aug. 2, 2013 (Aug. 2, 2013), XP055399754, Retrieved from the Internet <URL:https://www.chemineer.com/gas-dispersion/item/download/309_7fda03d99f48ece47c8515297f1f2774.html> [retrieved on Aug. 18, 2017].
GMBH Schumacher Verfahrenstechnik: "Statische Mischer und deren Verwendung", Jun. 5, 2011 (Jun. 6, 2011), XP055399755, Retrieved from the Internet <URL:http://schumacher-verfahrenstechnik.de/fileadmin/downloads/statische_mischer_und_deren_Verwendung.pdf> [retrieved on Aug. 18, 2017].

\* cited by examiner a.

b.

PACKING FOR IMPROVING CONTACT BETWEEN A GAS PHASE AND A DISPERSED SOLID PHASE MOVING IN COUNTER-CURRENT FLOW

CONTEXT OF THE INVENTION

The invention consists in a novel type of packing intended to equip strippers in fluid catalytic cracking (abbreviated to FCC) units.

FIG. 1 depicts a schematic view of an FCC unit using the so-called R2R technology, namely having one riser 1 and two regenerators 5 and 6 in series. This technology is particularly well-suited to the cracking of heavy feedstocks. The "riser" refers to the fluidized upflow tubular reactor in which the cracking reactions take place.

Because the vocabulary used in the context of FCC is well known and derived from English-language terms, it is those terms that will be used in the remainder of the text. The regenerated catalyst coming from the second regenerator (6) is introduced into the base of the riser (1), rises up along the riser (1) giving rise to the cracking reactions and to certain parasitic reactions that lead to the production of coke that becomes deposited on the surface of said catalyst. The coked catalyst is separated from the gaseous cracking effluents in a separation device (2) situated in the upper part of the riser (1), which is a device generally supplemented by one or two cyclone stages, and is then introduced into a stripping zone (4) the purpose of which is to release as much as possible of the hydrocarbons adsorbed onto the surface of the catalyst, so as to leave a coked catalyst with the minimum possible amount of adsorbed hydrocarbons, which is then sent on to the regeneration section (5) and (6).

The regeneration section comprises a first stage (5) fluidized by a fluidizing member (12), followed by a second stage (6) fluidized by a fluidizing member (12'), the catalyst coming from this second stage being returned to the base of the riser (1).

Stripping is performed using a stripping fluid (9), generally steam. Inside the stripper, the flow is therefore generally counter current between a downflow emulsion phase (catalyst+gas) and the upflow fluidizing gas.

A packing (4), or any other equivalent technology (examples of packings are given in FIG. 2, these being, in order from right to left: deflectors, "disk—doughnut" plates, packing), arranged inside the stripper has the objective of encouraging contact between the catalyst and the stripping fluid and of ensuring good homogeneity.

One packing commonly used in FCC units employing R2R technology is shown in FIG. 2a.

An example of a method to which the packing according to the present invention is particularly well-suited is that of the R2R technology suited to the cracking of heavy hydrocarbon fractions such as vacuum distillates and atmospheric residues, generally hydrotreated beforehand.

However, the invention may apply to any fluidized catalytic conversion technologies in which a stripping unit is needed:

FCC with a single regenerator (suited to lighter feedstocks) or with orientations with different selectivities, naphtha catalytic cracking NCC, deep catalytic cracking DCC, methanol-to-olefin (MTO) or methanol-to-gasoline (MTG) conversion, etc.

BRIEF DESCRIPTION OF THE FIGURES

FIG. 6a corresponds to the initial poor distribution. This distribution is perpendicular to the planes containing the strips.

FIG. 7a corresponds to another poor distribution, perpendicular to that of FIG. 6a. FIGS. 7b, 7c and 7d have the same significance as FIGS. 6b, 6c and 6d, respectively.

EXAMINATION OF THE PRIOR ART

Figure 1:
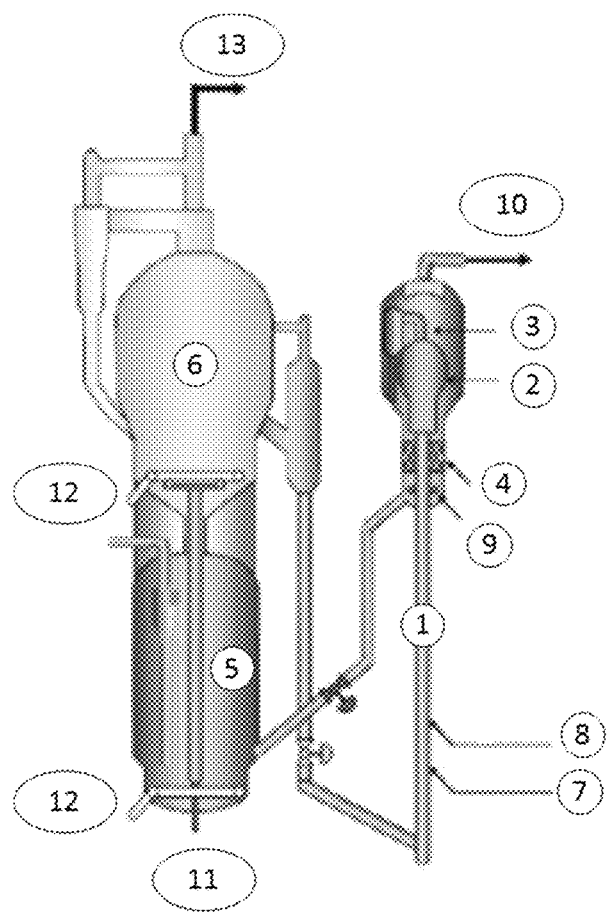
FIG. 1 is a schematic depiction of a catalytic cracking unit using the R2R technology, which allows the stripper to be correctly positioned at the upper end of the riser and showing the typical positioning of the packing contained therein.
Figure 2:
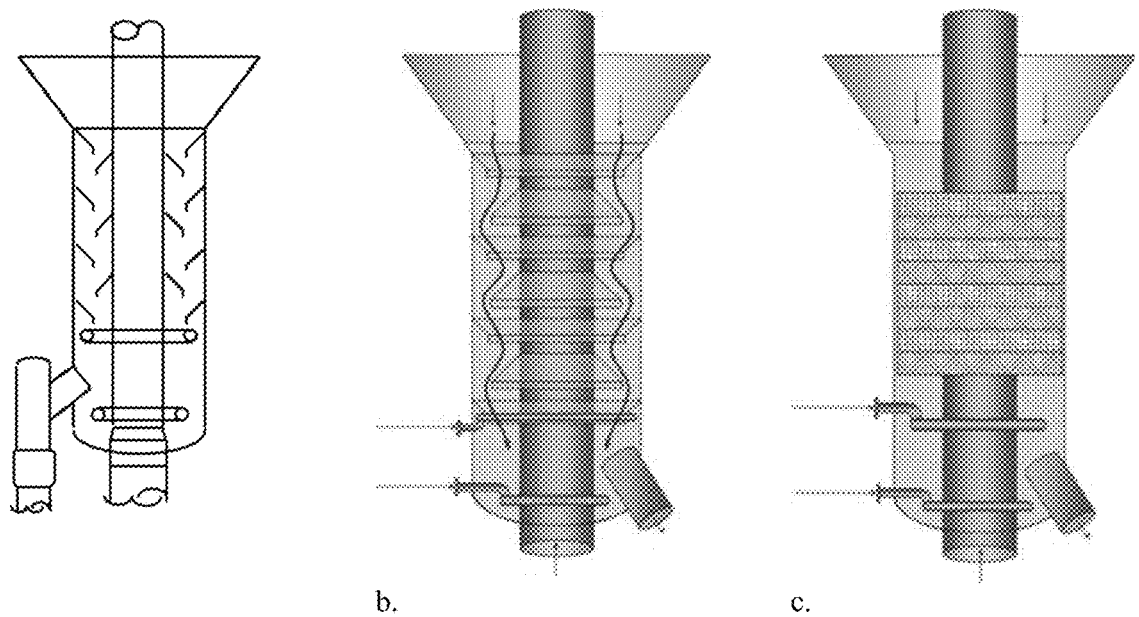
FIG. 2 provides a number of examples of typical packing used in stripping units.
Figure 3:
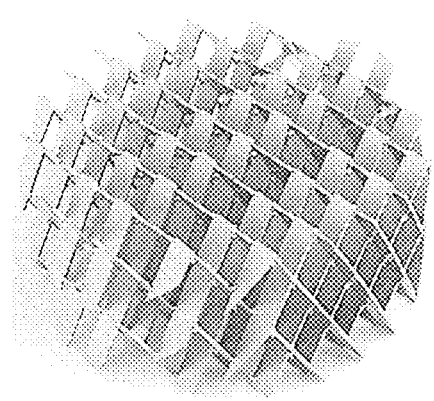
FIG. 3 is a 3-D depiction of the packing structure of the closest prior art corresponding to document U.S. Pat. No. 6,224,833, providing a visual example of the two systems of strips making between them an angle alpha comprised between 60 and 90°.

A fairly complete description of catalytic cracking using the R2R technology can be found in document U.S. Pat. No. 5,716,585.

Let it be recalled that the packing according to the present invention can be applied to all catalytic cracking technologies that call for a catalyst stripping section.

The closest prior art to the invention may be considered to be made up of document U.S. Pat. No. 6,224,833, which describes a "packing" made up of two series of parallel strips belonging to two different planes having an intersection. All the strips in one given plane are mutually parallel, and two most closely-spaced strips of the one same plane are separated by a space more or less the same size as the width of one strip.

The strips belonging to the second plane are situated precisely in the gaps left free by the strips of the first plane.

This results in a structure having a staggered configuration which forces the upflow gas to progress along a tortuous path and forces the catalyst in theory to slide along the various strips. Overall, the gas is routed along two series of parallel paths with meeting points, more specifically points of tangency, which are supposed to create disturbances, although this is not truly organized.

Document WO 2015/095 540 describes a packing structure using three strips situated in different planes. This results in a packing structure which approximates to the one described in document U.S. Pat. No. 6,224,833 in which the strips of the one same plane may exhibit different orientations along the median axis belonging to said plane. Nevertheless, each strip remains planar and that document does not describe a structure that is truly three-dimensional.

It is an object of the present invention to describe a packing structure that is truly three-dimensional, namely that has no favored direction, or favored plane, while at the same time having an organization that is not purely random. The objective of such a packing is to improve contact between the gas phase and the dispersed solid phase, so that there is no favored direction for the flow of this mixture considered in each flow volume element or, in other words, to achieve contact between the phases that is as anisotropic as possible.

Better contact between the coked catalyst and the stripping gas makes it possible, for the same overall performance characteristics, to reduce the flow rate of the stripping gas or the size of the stripper. In the case of operation with the same stripper dimensions and the same gas flow rate, a more homogeneous mixture makes it possible to improve the stripping and therefore reduce the Δcoke between the riser and the regenerator. As the Δcoke is the percentage by weight of coke and of hydrocarbons adsorbed onto the catalyst, this conventionally lies between 0.6 and 1% for a unit with a single regenerator and between 1 and 1.5% for a unit with two regenerators.

Better stripping would allow a between 5 and 10% improvement in the reduction of Δcoke in the stripper. The consequence of such a reduction in the Δcoke is a 5 to 10% increase in the solids recirculation flow rate (for the same temperature within the riser).

Furthermore, better stripping makes it possible to improve the output in terms of products that can be put to a profitable use.

Another advantage in improving the mixing between the emulsion of solid particles and gas is that of increasing the capacity of the stripper (higher internal flooding limit). In instances in which this capacity is the limiting factor of the unit, that also constitutes an increase in the overall capacity of the method.

BRIEF DESCRIPTION OF THE INVENTION

The present invention may be defined as a packing of three-dimensional structure intended notably to equip strippers of catalytic cracking units, and more generally of units which are to achieve as homogenous as possible contact between a gas phase and a dispersed solid phase, whatever the direction followed within said packing. This is what will be referred to in the remainder of the text as an anisotropic packing with three-dimensional structure.

More specifically, the packing according to the invention makes it possible to achieve homogenous contact between an upflow gas phase and a downflow dispersed solid phase moving in counter-current flow, said packing being characterized by a three-dimensional structure consisting in a collection of rows of chevrons.

The substantially parallel rows of chevrons are distributed between two planes forming an angle alpha of between 20 and 70° and preferably of between 45 and 60° with respect to the horizontal.

Each row of chevrons is itself characterized by an angle beta which constitutes the edge of the chevron, this angle beta being comprised between 60 and 120° and preferably comprised between 78 and 110°.

For industrial units, the width of a chevron is comprised between 3 and 40 cm, preferably comprised between 5 and 15 cm. For laboratory/pilot units, this width is comprised between 1 and 50 mm, and preferably between 3 and 15 mm.

The choice of this length needs to be set according to the characteristic size of the cavity housing the packing: a minimum of 2 to 4 periods needs to be assured.

Two rows of chevrons which are adjacent in the one same plane are separated by a space of approximately the same size as the width of a row of chevrons. The rows of chevrons belonging to the second plane are located precisely in the gaps left free by the rows of chevrons of the first plane, so as to form a staggered (quincunx) structure.

In an alternative form of the present invention, the edges of each row of chevrons are open, the width of said opening being comprised between 5% and 30%, and preferably between 8% and 25% of the width of the chevrons.

An opening of a width greater than 30% impairs the performance of the packing because too much empty space between the strips is space that the phase (emulsion or gas) crosses without resistance and therefore without being deflected and mixed with the second phase. This optimum-width effect is illustrated later on in the example appended to the present application.

The packing with three-dimensional structure according to the invention is produced in the form of parallelepipedal or cubic blocks of dimensions that may reach side lengths of up to 2 to 3 m each.

The packing according to the present invention is particularly applicable to fluid catalytic cracking methods as a way of improving contact between the upflow gas phase and the downflow emulsion phase (solid+gas) inside the stripper.

In the FCC application, the gas phase consists of steam and the solid phase of particles of catalyst with a mean diameter comprised between 30 and 150 microns, preferably between 40 and 90 microns, the stripper being a vessel that is fluidized at a fluidization rate typically of between 10 and 40 cm/s.

The solid stream in the stripper is typically between 10 and 250 kg/m$^2$.s, and preferably between 20 and 180 kg/m$^2$.s.

The present invention also relates to the method of manufacturing the packing, which may use so-called additive manufacturing techniques, for example selective laser melting, selective laser sintering, or else fused deposition modeling.

DETAILED DESCRIPTION OF THE INVENTION

The present invention may be defined as a packing of three-dimensional structure intended notably to equip strippers of catalytic cracking units, and more generally of units which are to achieve as homogenous as possible contact between a gas phase and a dispersed solid phase, whatever the direction followed within said packing. This is what will be referred to in the remainder of the text as an anisotropic packing with three-dimensional structure.

Figure 4:
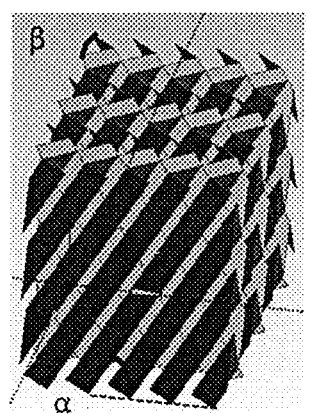
FIG. 4a is a 3-D depiction of the packing structure according to the invention in its so-called "closed chevron" variant.
FIG. 4b is a 3-D depiction of the packing structure according to the invention in its so-called "open chevron" variant.
Figure 4:
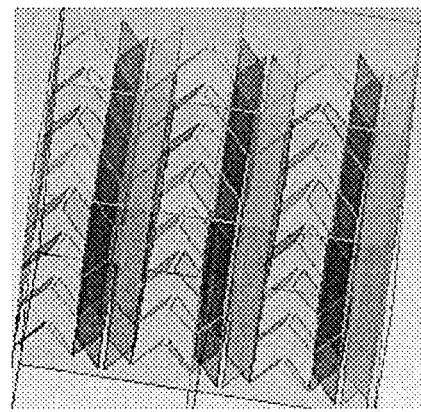

FIG. 4a depicts one type of packing according to the present invention.

The strips of document U.S. Pat. No. 6,224,833 are replaced here by rows of chevrons, which amounts to creating a fold that is symmetrical and along the longitudinal axis for each strip, the chevrons still being distributed in two planes forming between them an angle alpha comprised between 20° and 70°, preferably between 45° and 60°.

Each row of chevrons may be defined with respect to the two planes of the fold which between them form an angle beta that can vary from 60 to 120° and preferably that is comprised between 70 and 110°.

The structure thus created may be qualified as three-dimensional.

The angle alpha of each plane containing the rows of chevrons is comprised between 20 and 70° and preferably comprised between 45 and 60° with respect to the horizontal.

The angle beta which defines the edge of each row of chevrons is comprised between 60 and 120° and preferably comprised between 70 and 110°.

FIG. 4b depicts an evolution of the structure depicted in FIG. 4a, in which the edge corresponding to the angle of each fold has an opening that allows the gas to create a secondary path in a plane different from that of the main path. The width of said opening is comprised between 5% and 30%, and preferably between 8% and 25% of the width of the chevrons.

The solid can use these openings at the edges to create itself a secondary path different from the main path and make it possible to avoid a buildup of solids in the open part of the chevrons. Overall, this results in better contact between the gas and the solid.

The present packing is to a certain extent complicated to produce. Particularly in the case of the open-chevron variant with a slot at the fold.

Figure 5:
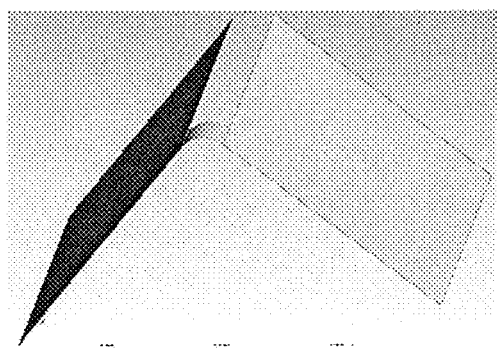
FIG. 5 provides a better visual example of the connection between two strips at the fold and shows the open-chevron variant with the opening at said fold.
Figure 5:
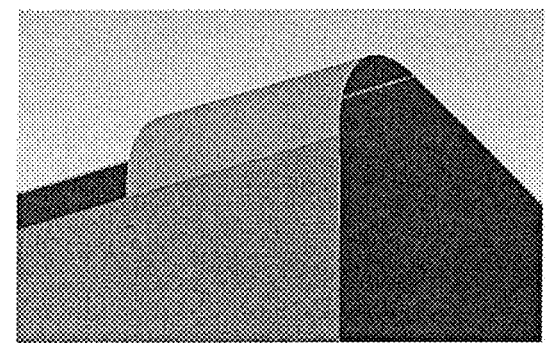

This is because, in this configuration, the elements do not touch and the rigidity of the chevron can be afforded for example by means of a narrow connecting strip, as indicated in FIG. 5. Another solution might be to place the packing between two filamentary meshes to which the ends of the strips could be welded to form a packing unit.

The packing according to the invention can also be produced using the new construction methods that call upon additive manufacturing techniques, for example selective laser melting (SLM), or selective laser sintering (SLS) or else fused deposition modeling (FDM).

The improvement to the mixing or contact between the gas and emulsion phases is evaluated by 3-D simulation using the fluid flow simulation software that goes by the trade name Ansys Fluent.

The simulation is performed at temperature: a liquid with a poorly distributed temperature profile (having a temperature gradient) flows downward with a mass flow rate of the same order of magnitude as the solid stream flow rate in a stripper (in this instance 100 kg/m².s). The way in which the poor distribution evolves axially (in the direction of the flow) is monitored.

The poor distribution consists in creating a situation whereby half the inlet cross section is irrigated with a hot fluid and the other half is irrigated with a cold fluid flowing co-currently. The temperature analogy for assessing changes in concentration has been well validated by those skilled in the art for this type of simulation.

More specifically, the effectiveness of the mixing is correlated with a coefficient referred to as the coefficient of variation, the definition of which is given below:

$$Cov = \sqrt{\frac{1}{A}\sum_{i=1}^{N} A_i \left(\frac{T_i - T_o}{T_o}\right)^2}$$

This formula relates to a surface area A, this surface area being divided into a number N of cells of elementary surface area Ai.

In general, the surface area A considered corresponds to that of a plane P passing through the calculation domain. It may, for example, correspond to a section of packing.

The entirety of the packing can therefore be swept by a series of planes P staged in the heightwise direction, each plane being denoted P(hi) to indicate that it relates to the elevation dimension h(i).

A denotes the total surface area of the section considered,
Ai denotes the surface area corresponding to the cell i,
N the total number of cells Ai contained in the surface area A,
Ti the local temperature of the cell i considered,
T0 the mean temperature over the surface area A.

In general, the lower the coefficient Cov, the better the mixing between the gas and solid phases in the plane considered.

In order to improve the qualification of the mixing a relative coefficient is introduced which takes account of the variation in the coefficient of mixing Cov between the fluid phase entering and this phase leaving. In general, a flow of solid placed in suspension in a gas can be considered to behave like a homogenous fluid with appropriate physicochemical properties (density, viscosity, etc.).

In this particular instance, in order to illustrate the ability of the packing to improve the mixing, the emulsion (solid+fluidizing gas) has been represented by a downward-flowing liquid phase, by working on the similarity in density. Half of the flow is at a set temperature of 350° K, the other half at another temperature 273° K etc.

The greater the relative variation in the coefficient of mixing between the inlet and the outlet of the packing zone, the better the quality of the mixing across the packing as a whole is considered to be.

$$Cov\_relative = \frac{Cov_{inlet} - Cov_j}{Cov_{inlet}}$$

EXAMPLES ACCORDING TO THE INVENTION

Figure 6:
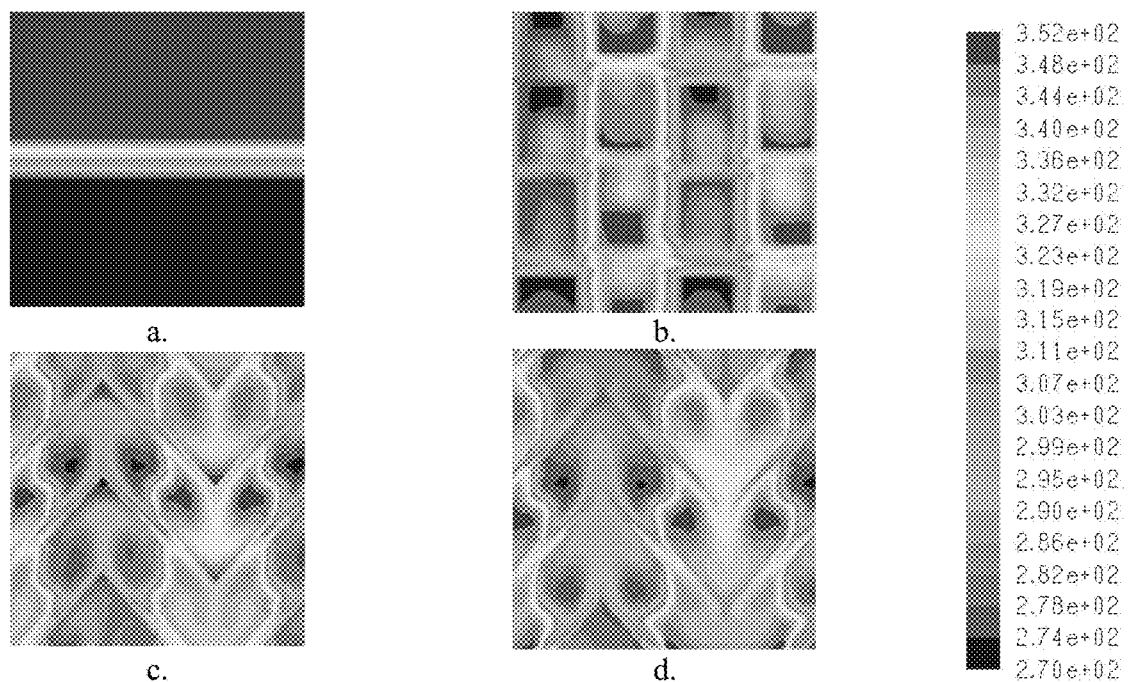
FIG. 6 is a comparison of the 3-D simulation results obtained by CFD (Computational Fluid Dynamics) for the packing of the prior art (FIG. 6b), for the packing according to the invention in the "closed chevron" variant (FIG. 6c), and for the packing according to the invention in the "open chevron" variant (FIG. 6d).
Figure 7:
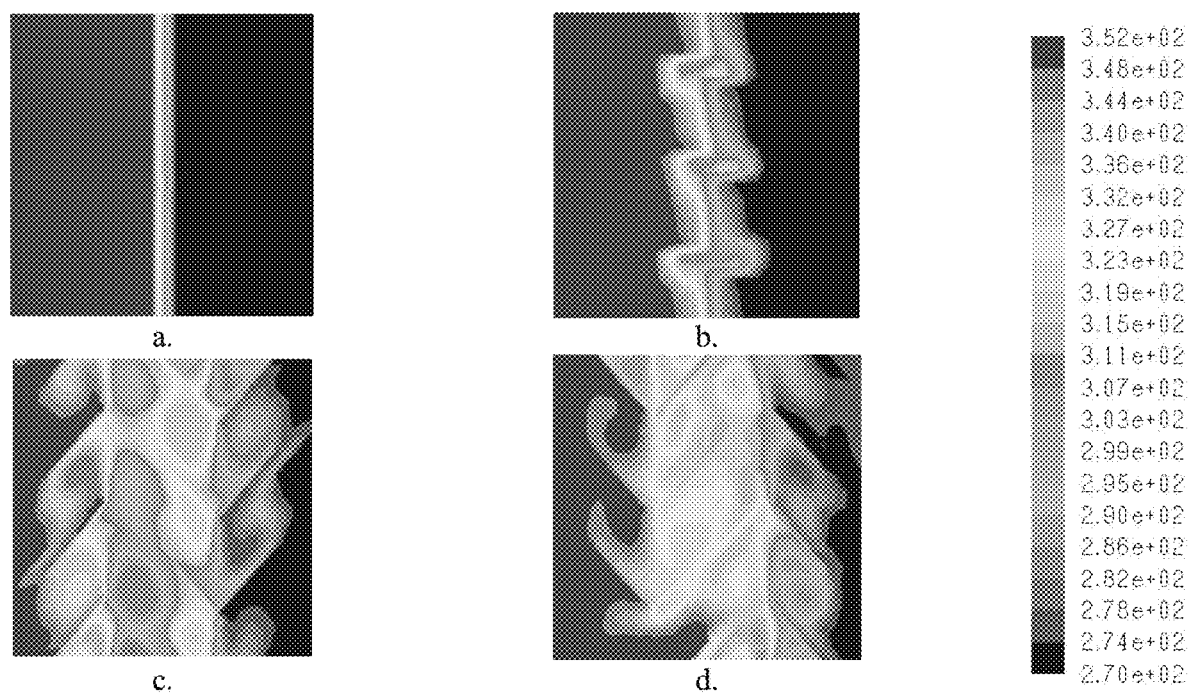
FIG. 7 presents the results of CFD simulation for the same geometries with an initial poor distribution perpendicular to that of FIG. 6 and therefore, in this case, parallel to the planes of the strips.

In the comparative example below, a packing of the prior art corresponding to document U.S. Pat. No. 6,224,833 (FIG. 6b) is compared with two packings according to the invention in the "closed chevron" variant (FIG. 6c), and the "open chevron" variant (FIG. 6d).

For laboratory units or pilot units, the width of a chevron is comprised between 1 and 50 mm, preferably between 3 and 15 mm.

For the various geometries tested, the width of the strips is 6.7 cm, with an inclination with respect to the horizontal alpha of 60° and a spacing between the strips belonging to the same plane of 8 cm.

In the case of the chevrons with openings, the width of the strips is decreased by the percentage of opening. The angle beta of the chevrons is 90°.

It may be noted that there is a certain lateral spread in the temperatures in FIGS. 5c and 5d, indicating that contact between the hot and cold streams occurs no longer merely in the direction of the strips but also in a substantially perpendicular direction, something which is a factor in the increase in the coefficient of mixing. The mixing in a direction perpendicular to the planes of the strips is better illustrated by the results in FIG. 6. In this figure, the initial poor distribution is rotated through 90° with respect to that of FIG. 5. The packing according to the invention does therefore indeed achieve three-dimensional contact.

Table 1 below confirms, by means of the relative coefficient of mixing, that there is indeed an improvement in the mixing of the phases between the liquid inlet plane and a plane situated 40 cm lower down in the packing zone.

For the open chevrons, two scenarios are presented, these corresponding to widths of openings of 10 and 30%. The results obtained show that a 30% opening yields a result substantially identical to the reference packing, hence the benefit of restricting this opening to 25% at maximum.

TABLE 1 comparison between the relative Cov between the inlet of the packing and 40 cm above, for various packings of the prior art and according to the invention

| Packing | Prior art | "Closed" chevrons | "Open" chevrons (10% opening) | "Open" chevrons (30% opening) (outside of the invention) |
|---|---|---|---|---|
| Cov-relative (%) 1$^{st}$ scenario (FIG. 5) | 23 | 29 | 32 | 23 |
| Cov-relative (%) 2$^{nd}$ scenario (FIG. 6) | 4 | 17 | 19 | — |

The invention claimed is:

1. A packing effective to provide homogenous contact between a gas phase and a dispersed solid phase moving in counter-current flow, said packing comprising a three-dimensional structure consisting in a collection of rows of chevrons, these substantially parallel rows of chevrons being distributed between two planes the chevrons of which form an angle alpha of between 20 and 70° with respect to the horizontal, and each row of chevrons itself comprising an angle beta constituting the edge of the chevron, this angle beta being 60 to 120°, the width of a chevron being 3 to 40 cm, two rows of chevrons which are adjacent in a first plane being separated by a space approximately equal to the width of a row of chevrons, the rows of chevrons belonging to a second plane being located precisely in the gaps left free by the rows of chevrons of the first plane, so as to form a staggered structure, and said packing being placed between two filamentary meshes to which the ends of the rows of chevrons are welded to form a packing unit.

2. The packing with three-dimensional structure as claimed in claim 1, wherein the edges of each row of chevrons are open, the width of said opening being 5% to 30% of the width of the chevrons.

3. The packing with three-dimensional structure as claimed in claim 1, each row of chevrons comprising an angle beta constituting the edge of the chevron, this angle beta being 70 to 110°, the width of a chevron being 5 to 15 cm.

4. The packing with three-dimensional structure as claimed in claim 1, wherein the edges of each row of chevrons are open, the width of said opening being 8% to 25% of the width of the chevrons.

5. The packing with three-dimensional structure as claimed in claim 1, wherein the substantially parallel rows of chevrons are distributed between two planes the chevrons of which form an angle alpha of between 45 and 60°.

6. A catalytic cracking method comprising subjecting a hydrocarbon feed to the packing as claimed in claim 1, said packing improving contact between an upflow gas phase and a downflow emulsion phase inside a stripper of a catalytic cracking unit, the method being conducted at a fluidization rate being of 10 cm/s to 40 cm/s and a solid flow of 10 to 250 kg/m$^2$.s.

7. The catalytic cracking method as claimed in claim 6, comprising cracking of heavy hydrocarbon fractions (R2R).

8. The catalytic cracking method as claimed in claim 6, comprising cracking of light hydrocarbon fractions (NCC).

9. The catalytic cracking method as claimed in claim 6, comprising deep catalytic cracking of hydrocarbon fractions (DCC).

10. The catalytic cracking method as claimed in claim 6, conducted at a solid flow of 20 to 180 kg/m$^2$.s.

11. A method of manufacturing the packing as claimed in claim 1, using an additive manufacturing technique comprising selective laser melting, selective laser sintering, or fused deposition modeling.

* * * * *